(12) United States Patent
Konermann et al.

(10) Patent No.: US 8,561,455 B2
(45) Date of Patent: Oct. 22, 2013

(54) SENSOR HEAD FOR FILM MEASUREMENTS

(75) Inventors: Stefan Konermann, Remscheid (DE);
Markus Stein, Gevelsberg (DE)

(73) Assignee: Plast-Control GmbH, Remscheid (DE)

( * ) Notice: Subject to any disclaimer, the term of this patent is extended or adjusted under 35 U.S.C. 154(b) by 407 days.

(21) Appl. No.: 12/938,831

(22) Filed: Nov. 3, 2010

(65) Prior Publication Data
US 2011/0107818 A1    May 12, 2011

(30) Foreign Application Priority Data
Nov. 10, 2009    (DE) .......................... 10 2009 052 585

(51) Int. Cl.
*G01B 13/06* (2006.01)
(52) U.S. Cl.
USPC .......................................... 73/37.5; 324/662
(58) Field of Classification Search
USPC ................................ 73/37.5; 324/662; 355/76
See application file for complete search history.

(56) References Cited

U.S. PATENT DOCUMENTS

| 6,020,952 A * | 2/2000 | Cipolla et al. ................... 355/76 |
| 2006/0152231 A1 * | 7/2006 | Konermann et al. ......... 324/662 |

FOREIGN PATENT DOCUMENTS

| DE | 102007034415 A1 | 1/2009 |
| EP | 1681531 A1 | 1/2005 |
| WO | 2009/027037 A1 | 3/2009 |

* cited by examiner

*Primary Examiner* — Hezron E Williams
*Assistant Examiner* — Gregory J Redmann
(74) *Attorney, Agent, or Firm* — Richard M. Goldberg

(57) ABSTRACT

A sensor head for measurement of a film, includes a guide surface (14) for the film, at least one sensor element (28, 30) integrated in the guide surface for measuring a property of the film, and a generator for generating an air cushion between the guide surface (14) and the film, the generator including a system for supplying a pressure medium, and a guide member (12) that is made of a porous material and forms at least a part of the guide surface (14) and is adapted to distributedly discharge the pressure medium into the air cushion, the guide member (12) having a channel system (16, 18) that divides the guide surface (14) into a plurality of fields (20, 22) that, if not disconnected, are connected only by narrow lands, the channel system being configured for draining the pressure medium from the air cushion.

6 Claims, 3 Drawing Sheets

SENSOR HEAD FOR FILM MEASUREMENTS

BACKGROUND OF THE INVENTION

The invention relates to a sensor head for film measurements, comprising a guide surface for the film, at least one sensor element integrated in the guide surface for measuring a property of the film, and a generator for generating an air cushion between the guide surface and the film, said generator comprising a system for supplying a pressure medium, and a guide member that is made of a porous material and forms at least a part of the guide surface and is adapted to distributedly supply the pressure medium into the air cushion.

A sensor head of this type is used for example in the process of manufacturing blown films, where it is desired to continuously measure the thickness of the film that has been extruded and inflated to a bubble with internal air during the process, so that the conditions of extrusion and cooling may be feedback-controlled such that the film assumes a constant thickness that is uniform throughout the periphery of the film bubble. To that end, the sensor head may comprise one or more optical, radiometric, inductive or capacitive sensor elements with which it is possible to measure the film thickness from one side of the film. An example of a capacitive sensor head has been described in WO 2009/027037 A1.

Preferably, the sensor head revolves on a trajectory around the film bubble so that the film thickness on the entire periphery of the bubble can be measured during one revolution. Moreover, the sensor head should be arranged such that it slightly depresses the film inwardly, so that the film is pressed against the guide surface by the internal pressure of the film bubble. On the other hand, a direct contact between the film and the guide surface should be avoided, especially when the film has not yet been cooled down completely and is somewhat sticky, in order to prevent the film and/or the sensor head from being damaged. For this reason, a pressure medium, e.g. compressed air, is used for generating an air cushion, so that the film may slide over the guide surface without making contact therewith but with a well-defined spacing.

DE 10 2007 034 415 described a sensor head of the type indicated above, wherein the guide surface or at least a part of this guide surface that surrounds the sensor element is formed by a guide member made of a porous material. The compressed air is pressed through the porous material, so that the supply of compressed air is uniformly distributed over the guide surface and, consequently, local distortions of the film are avoided. Otherwise, in some of the known measurement processes, e.g. in case of capacitive measurement with the sensor head described in WO 2009/027037, the measurement result could be corrupted by local fluctuations of the spacing between the film and the guide surface.

SUMMARY OF THE INVENTION

It is an object of the invention to provide a sensor head which permits to better stabilize the air cushion.

In order to achieve this object, according to the invention, the guide member has a channel system that subdivides the guide surface into several fields that, if not disconnected, are connected only by narrow lands, the channel system being configured for draining the pressure medium from the air cushion.

In order to avoid a direct contact between the film and the guide surface of the sensor head, especially in a case where the film tends to flutter, the guide surface should have a certain minimum size. Then, however, the air cushion must be relatively extended, and a correspondingly large flow rate of the pressure medium is necessary for maintaining the air cushion. Even when the pressure medium is supplied via a porous material, this may lead to accumulations of the pressure medium in the air cushion, so that a "slug" is formed between the film and the guide surface, and this slug tends to escape uncontrollably in one or the other direction. This creates undesired fluctuations in the distance between the film and the sensor element in the guide surface.

However, in the sensor head according to the invention, the guide surface or at least the part thereof that is formed by the guide member is divided into several separate fields by the channel system, and although the guide surface as a whole has a sufficient size, the individual fields are so small that no undesired slugs are formed within these fields. The excessive pressure medium is drained via the channels formed between the fields before a slug can form. The result is an air cushion that is stable in both, space and time and permits an exact measurement of the property of the film to be measured, e.g., the film thickness.

The individual fields of the guide surface may be completely isolated from one another. However, the fields may also be connected by lands and may form a contiguous structure that is however nerved by the channels. It is decisive that, from any point within a field, the distance to the closest channel is so short that the air can be drained without accumulating in a slug.

Depending upon the construction of the sensor elements, the sensor head according to the invention may also be used for measuring other properties of the film, e.g. the temperature or the layer structure of a multi-layer film.

In this context, the term "film" encompasses any flat material, especially a flexible web material.

Useful details and further developments of the invention are indicated in the dependent claims.

In one embodiment, the channel system forms a plurality of parallel channels that extend in the direction of movement of the film relative to the sensor head. Correspondingly, the guide surface is divided into fields that are elongated in said direction of movement.

However, in another embodiment, it is also possible to provide a system of channels that cross each other and divide the guide surface into a two-dimensional raster of fields. In this case, the channels do not have to have a uniform width, but may for example be shaped such that the fields delimited by the channels have a circular or elliptic shape, for example.

Preferably, the sensor element or the sensor elements are embedded in the guide surface in such a manner that they are surrounded by fields of the guide member.

In case of a capacitive sensor head, the sensor elements are formed by plate-like electrodes the surfaces of which extend in the guide surface or in parallel therewith. In this case, the electrodes themselves may be made of a porous material, so that they form part of the guide member.

In general, the guide member may be formed by a microporous sinter metal of the type that is also used, for example, for vacuum chucks in the machine industry. The porosity of the guide member may also be achieved by means of micro bores, for example, e.g. bores having a diameter in the order of magnitude of 0.5 mm or less, which bores preferably have a cross section that flares out towards the guide surface.

The channels may have open ends for draining the air laterally, but they may also communicate with perforations or slots of the guide member through which the air is drained rearwardly.

BRIEF DESCRIPTION OF THE DRAWINGS

An embodiment example will now be described in detail in conjunction with the drawings, wherein.

DETAILED DESCRIPTION

Figure 1:
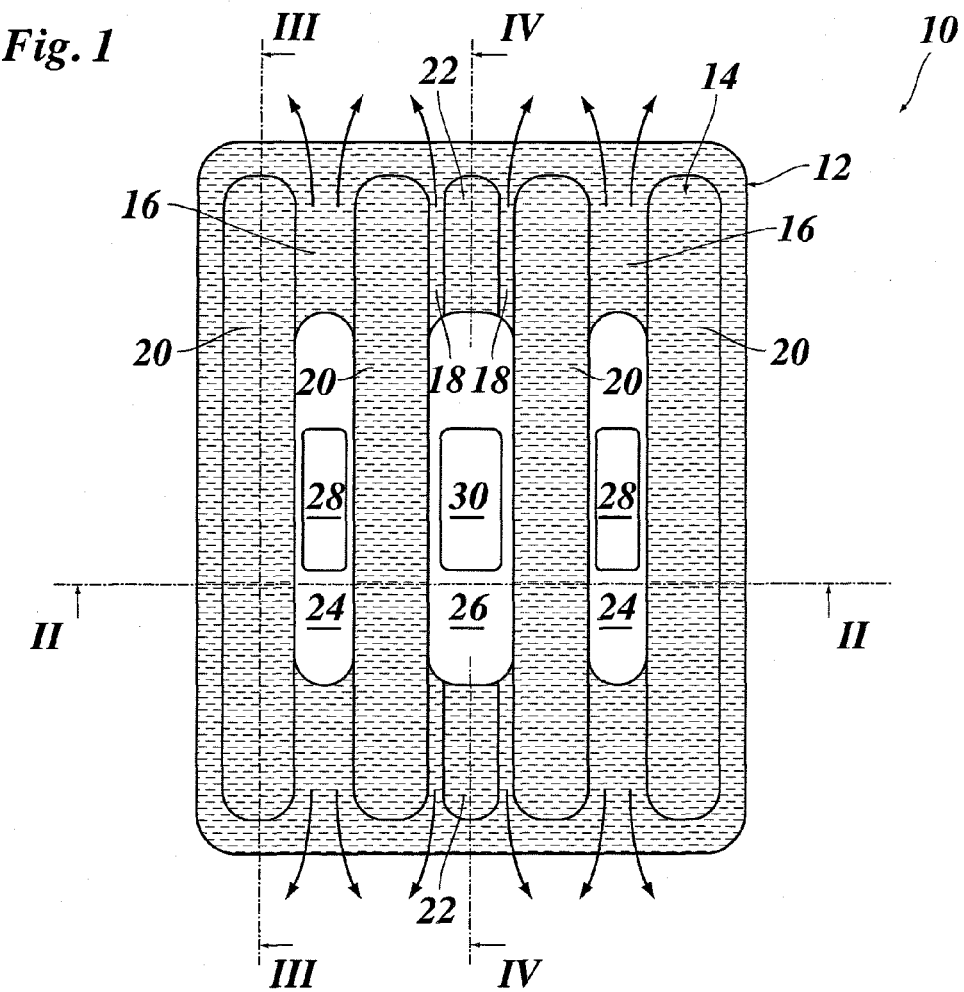
FIG. 1 shows a plan view of a sensor head according to the invention.

The sensor head 10 shown in FIG. 1 comprises a guide member 12 made of micro-porous sinter metal and forming a guide surface 14 that faces the viewer in FIG. 1. A channel system formed by parallel, open-ended channels 16, 18 divides the guide surface 14 into a number of elongated fields 20, 22.

The guide member 12 is perforated by three slots 24, 26 that extend in parallel with the channels 16, 18 and each accommodate a sensor element 28, 30. The central slot 26 interrupts the central field 22 and the channels 18 that delimit the same. In the example shown, the sensor elements 28, 30 are capacitor plates the surfaces of which are approximately flush with the guide surface 14.

Figure 2:
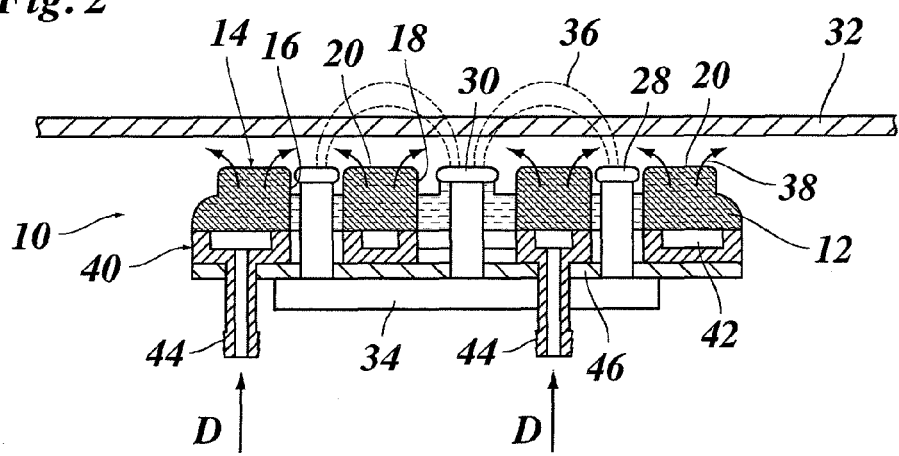
FIG. 2 shows a schematic cross-section along the line II-II in FIG. 1.

FIG. 2 shows a cross-sectional view of the sensor head 10 and a film 32 the thickness of which shall be measured by means of the sensor head.

An electronic control and processing circuit 34 applies an electric voltage to the sensor elements (capacitor plates) 28, 30, so that an electric field 36 passing through the film 32 is formed between these plates. The capacitors formed by the sensor elements 28, 30 together with other circuit components of the control and processing circuit 34 form oscillating circuits having natural frequencies that depend upon the thickness and the dielectric constant of the film 32, so that, when the dielectric constant of the film material is known, the thickness of the film can be determined.

Since a direct contact between the film 32 and the sensor head 10 should be avoided, the film 32 hovers on an air cushion that has been symbolised by arrows 38 in FIG. 2. For generating the air cushion 38, a distributor plate 40 is arranged below the guide member 12, and the distributor plate is perforated by the slots 24, 26 just as the guide member 12 and forms a system of distributing chambers 42 in the surroundings of the slots 24, 26, each of said distributing chambers being arranged below one of the fields 20, 22 and supplied with a pressure medium (arrows D), e.g. compressed air, via one or more connectors 44.

The guide member 12 has an open-cell pore structure with a medium pore size of, for example, 10 to 100 μm, preferably about 15 μm, and is therefore permeable for the pressure medium. The pressure medium is supplied at a positive pressure in the order of magnitude from 0.1 to 0.15 MPa and penetrates the fields 20, 22 of the guide member and exits at the guide surface 14 facing the film 32 so as to create the air cushion. The pressure medium that has been supplied into the air cushion can be discharged at the edge of the sensor head.

As can be seen in FIG. 2, the extent to which the electric field 36 penetrates the film 32 depends critically upon the thickness of the air cushion, i.e. the distance between the film 32 and the guide surface 14. For this reason, it is important that the air cushion can be kept as stable as possible. According to the invention, this is achieved by the channels 16, 18 which nerve the guide surface 14 and divide the same into the relatively small fields 20, 22. The channels 16, 18 facilitate and accelerate the discharge of the pressure medium that has been supplied into the air cushion, as is symbolised by arrows in FIG. 1. In particular, the pressure medium is prevented from accumulating in the central region of the air cushion and from forming there a slug that distorts the film 32 and then escapes uncontrollably to one or the other side in FIG. 2. In this way, the channels 16, 18 contribute to maintaining a stable, well-defined distance between the film 32 and the guide surface 14 and thereby to improving the measurement accuracy of the sensor head.

Optionally, in a modified embodiment, one of the sensor elements 28, 30 may be combined with an optical sensor that serves for measuring the actual distance between the film 32 and the guide surface 14, so that any possible deviations of this distance from a target value can be compensated arithmetically.

In the example shown, the sensor elements 28, 30 are mounted on a board 46 that is attached to the back side (bottom side) of the distributor plate 40 and carries also the control and processing circuit 34.

Optionally, part of the air from the channels 16, 18 may also be drained via the slots 24, 26 and corresponding perforations of the board 46 towards the back side or bottom side in FIG. 2.

Figure 3:
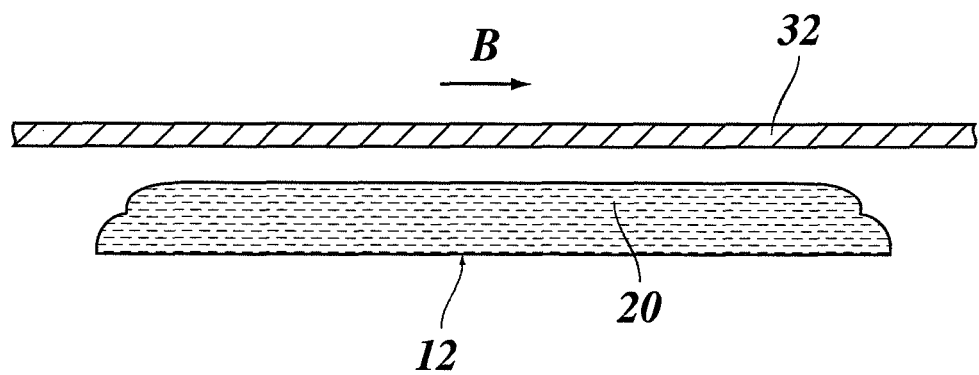
FIG. 3 shows a longitudinal section corresponding to the line in FIG. 1.

FIG. 3 shows one of the fields 20 of the guide member 12 in a longitudinal section, the longitudinal direction being defined as the direction in which the film 32 moves relative to the sensor head. This direction has been indicated by an arrow B in FIG. 3. It can be seen that the fields 20 are considerably rounded-off at both ends, so that a contact between the film and the guide member 12 is reliably avoided also in those regions where the film 32 enters the sensor head or leaves the same and the air cushion breaks down.

Figure 4:
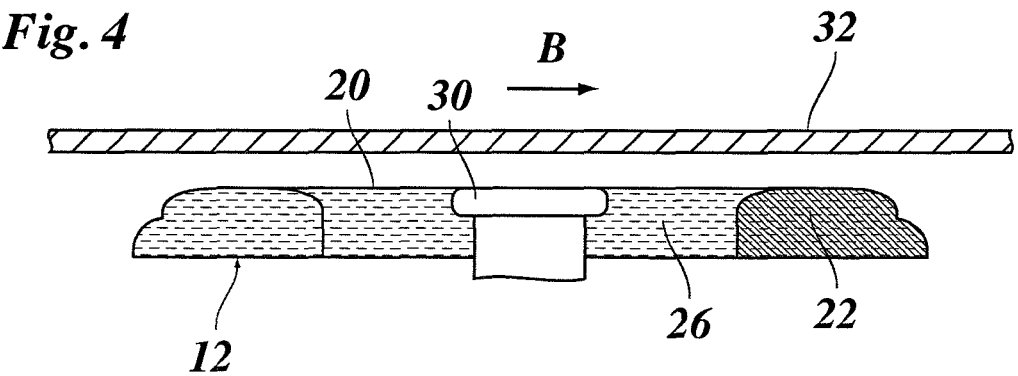
FIG. 4 shows a longitudinal section corresponding to the line IV-IV in FIG. 1.

As is shown in FIG. 4, the same applies also to the fields 22 that adjoin the slot 26 of the guide member 12 in longitudinal direction.

Figure 5:
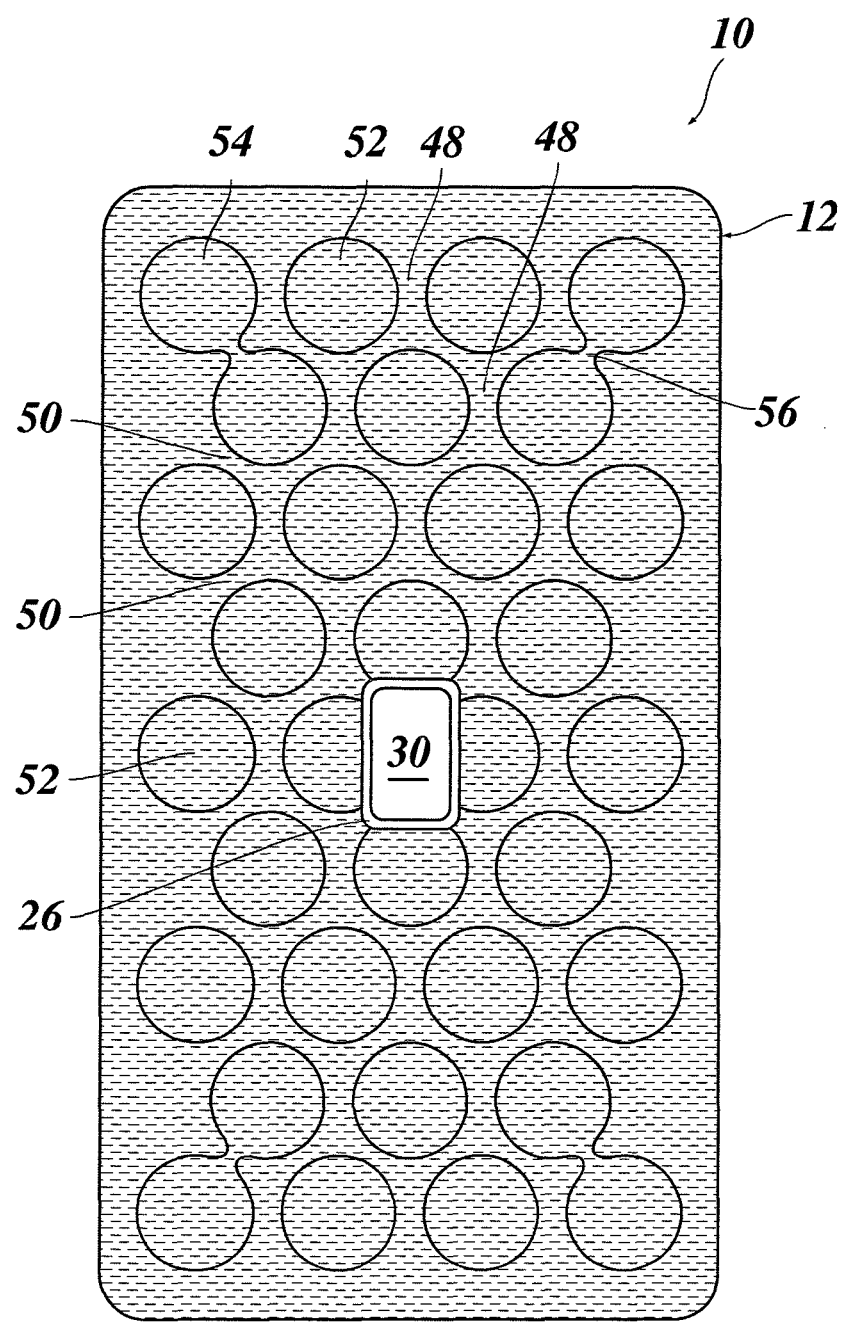
FIG. 5 shows a plan view of a sensor head according to a modified embodiment.

FIG. 5 shows an embodiment example in which the channel system is formed by channels 48, 50 of varying width that extend not only in parallel with the direction of movement of the film but also in transverse and/or oblique directions and divide the guide surface into island-like circular or oval fields 52, 54. Some or all of these fields 54 may also be connected to one another by narrows lands 56.

In this example, there is provided only a single sensor element 30 that forms all capacitor plates of the capacitive sensor. The capacitor plates have not been shown here in detail.

What is claimed is:

1. A sensor head for measurement of a film, comprising:
   a guide surface for the film,
   at least one sensor element integrated in the guide surface for measuring a property of the film, and
   a generator for generating an air cushion between the guide surface and the film, said generator comprising:
   a system for supplying a pressure medium, and
   a guide member made of a porous material and forms at least a part of the guide surface and is adapted to distributedly discharge the pressure medium into the air cushion, the guide member having a channel system formed by at least one channel that is recessed relative to the guide surface, that opens to an outside of said guide member, and that divides the guide surface into a plurality of fields in a manner such that the pressure medium discharged into the air cushion is separated into divided flow rates which substantially eliminates accumulation of the pressure medium in the air cushion to prevent distortion of the film, and
the plurality of fields being one of:
disconnected, and
connected only by narrow lands,
said channel system being configured for draining the pressure medium from the air cushion.

2. The sensor head according to claim 1, wherein the guide member is made of a micro-porous material.

3. The sensor head according to claim 1, wherein the channel system communicates with at least one perforation of the guide member, said at least one perforation leading to a back side of the guide member.

4. The sensor head according to claim 1,
wherein the guide member has at least one slot that accommodates at least one said sensor element, and
wherein the fields are one of:
arranged on both sides of said at least one slot distributed around said at least one slot.

5. The sensor head according to claim 1, wherein the at least one channel comprises a plurality of parallel channels that extend in a direction of movement of the film and separate a plurality of said fields that are elongated in said direction.

6. The sensor head according to claim 1, wherein the at least one channel comprises a plurality of channels that delimit at least one of:
round island-like fields, and
oval island-like fields.

* * * * *